United States Patent
Lin et al.

(10) Patent No.: US 11,450,312 B2
(45) Date of Patent: Sep. 20, 2022

(54) SPEECH RECOGNITION METHOD, APPARATUS, AND DEVICE, AND STORAGE MEDIUM

(71) Applicant: TENCENT TECHNOLOGY (SHENZHEN) COMPANY LIMITED, Shenzhen (CN)

(72) Inventors: Shilun Lin, Shenzhen (CN); Xilin Zhang, Shenzhen (CN); Wenhua Ma, Shenzhen (CN); Bo Liu, Shenzhen (CN); Xinhui Li, Shenzhen (CN); Li Lu, Shenzhen (CN); Xiucai Jiang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 258 days.

(21) Appl. No.: 16/900,824

(22) Filed: Jun. 12, 2020

(65) Prior Publication Data
US 2020/0312309 A1    Oct. 1, 2020

Related U.S. Application Data

(63) Continuation of application No. PCT/CN2019/076223, filed on Feb. 27, 2019.

(30) Foreign Application Priority Data

Mar. 22, 2018  (CN) .................. 201810240076.X

(51) Int. Cl.
*G10L 15/02*  (2006.01)
*G10L 15/16*  (2006.01)
(Continued)

(52) U.S. Cl.
CPC ............. *G10L 15/16* (2013.01); *G10L 15/02* (2013.01); *G10L 15/05* (2013.01); *G10L 15/142* (2013.01);
(Continued)

(58) Field of Classification Search
CPC ......... G10L 15/22; G10L 15/16; G10L 15/02; G10L 15/05; G10L 15/142; G10L 2015/088; G10L 2015/025
(Continued)

(56) References Cited

U.S. PATENT DOCUMENTS 9,390,708 B1    7/2016  Hoffmeister
9,477,753 B2 *  10/2016  Kingsbury .............. G10L 25/54
(Continued)

FOREIGN PATENT DOCUMENTS

CN    105679316 A    6/2016
CN    106157950 A    11/2016
(Continued)

OTHER PUBLICATIONS

The European Patent Office (EPO) The Extended European Search Report for 19770634.4 dated Apr. 16, 2021 9 Pages.
(Continued)

*Primary Examiner* — Vijay B Chawan
(74) *Attorney, Agent, or Firm* — Anova Law Group, PLLC

(57) ABSTRACT

A speech recognition method includes: obtaining speech information; and determining beginning and ending positions of a candidate speech segment in the speech information by using a weighted finite state transducer (WFST) network. The candidate speech segment is identified as corresponding to a preset keyword. The method also includes clipping the candidate speech segment from the speech information according to the beginning and ending (Continued)

positions of the candidate speech segment; detecting whether the candidate speech segment includes a preset keyword by using a machine learning model; and determining, upon determining that the candidate speech segment comprises the preset keyword, that the speech information comprises the preset keyword.

20 Claims, 10 Drawing Sheets

(51) Int. Cl.
    *G10L 15/05*     (2013.01)
    *G10L 15/14*     (2006.01)
    *G10L 15/22*     (2006.01)
    *G10L 15/08*     (2006.01)

(52) U.S. Cl.
    CPC ........ *G10L 15/22* (2013.01); *G10L 2015/025* (2013.01); *G10L 2015/088* (2013.01); *G10L 2015/223* (2013.01)

(58) Field of Classification Search
    USPC .... 704/270, 270.1, 251, 231, 257, 275, 232, 704/252
    See application file for complete search history.

(56) References Cited

U.S. PATENT DOCUMENTS

| | | | | |
|---|---|---|---|---|
| 11,295,739 | B2* | 4/2022 | Li | G10L 15/16 |
| 11,308,958 | B2* | 4/2022 | Smith | H04R 3/005 |
| 2005/0273334 | A1 | 12/2005 | Schleifer et al. | |
| 2008/0294437 | A1* | 11/2008 | Nakano | G06F 40/289 704/E15.001 |
| 2014/0358543 | A1* | 12/2014 | Chino | G06Q 10/105 704/254 |
| 2015/0279358 | A1* | 10/2015 | Kingsbury | G10L 15/02 704/257 |
| 2017/0004824 | A1 | 1/2017 | Yoo et al. | |
| 2018/0006837 | A1* | 1/2018 | Cartwright | H04M 3/568 |
| 2018/0027123 | A1* | 1/2018 | Cartwright | H04M 3/42221 379/202.01 |
| 2018/0027351 | A1* | 1/2018 | Cartwright | H04M 3/56 381/303 |
| 2018/0190266 | A1* | 7/2018 | Sun | G10L 15/14 |
| 2018/0191912 | A1* | 7/2018 | Cartwright | G10L 15/22 |
| 2018/0279063 | A1* | 9/2018 | Sun | G10L 21/043 |
| 2018/0295240 | A1* | 10/2018 | Dickins | H04M 3/568 |
| 2018/0336902 | A1* | 11/2018 | Cartwright | G06F 16/61 |
| 2020/0027462 | A1 | 1/2020 | Wang et al. | |
| 2020/0092422 | A1* | 3/2020 | Dickins | H04M 3/42221 |
| 2020/0127865 | A1* | 4/2020 | Cartwright | H04L 65/1083 |

FOREIGN PATENT DOCUMENTS

| | | |
|---|---|---|
| CN | 106328127 A | 1/2017 |
| CN | 106448663 A | 2/2017 |
| CN | 107230475 A | 10/2017 |
| CN | 107578776 A | 1/2018 |
| CN | 107622770 A | 1/2018 |
| CN | 107767863 A | 3/2018 |
| CN | 108564941 A | 9/2018 |

OTHER PUBLICATIONS

Assaf Hurwitz Michaely et al., "Keyword Spotting for Google Assistant Using Contextual Speech Recognition," 2017 IEEE Automatic Speech Recognition and Understanding Workshop (ASRU), Dec. 16, 2017, pp. 272-278. 7 pages.

Guangsen Wang et al., "Context Dependent Acoustic Keyword Spotting Using Deep Neural Network," 2013 Asia-Pacific Signal and Information Processing Association Annual Summit and Conference (APSIPA), Oct. 29, 2013, pp. 1-10. 10 pages.

Ye Bai et al., "End-to-end Keywords Spotting Based on Connectionist Temporal Classification for Mandarin," 2016 10th International Symposium on Chinese Spoken Language Processing (ISCSLP), Oct. 17, 2016, pp. 1-5. 5 pages.

Tara N. Sainath et al., "Convolutional Neural Networks for Small-footprint Keyword Spotting," INTERSPEECH 2015, Sep. 6, 2015, pp. 1-5. 5 pages.

The World Intellectual Property Organization (WIPO) International Search Report for PCT/CN2019/076223 dated Jun. 3, 2019 6 Pages (including translation).

The State Intellectual Property Office of the People's Republic of China (SIPO) Office Action 1 for 201810240076.X dated Oct. 18, 2019 8 Pages (including translation).

* cited by examiner

SPEECH RECOGNITION METHOD, APPARATUS, AND DEVICE, AND STORAGE MEDIUM

CROSS-REFERENCES TO RELATED APPLICATIONS

This application is a continuation application of PCT Patent Application No. PCT/CN2019/076223, filed on Feb. 27, 2019, which claims priority to Chinese Patent Application No. 201810240076.X, filed with the National Intellectual Property Administration, PRC on Mar. 22, 2018 and entitled "SPEECH RECOGNITION METHOD, APPARATUS, AND DEVICE, AND STORAGE MEDIUM", the entire contents of both of which are incorporated herein by reference.

FIELD OF THE TECHNOLOGY

The present disclosure relates to the field of speech recognition, and in particular, to a speech recognition method, apparatus, and device, and a storage medium.

BACKGROUND OF THE DISCLOSURE

Speech wakeup, also referred to as keyword spotting (KWS), is a function that, when recognizing that a user speech includes a preset keyword, lifting a dormant state or a lock screen state of an electronic device, thereby initiating a speech interaction operation. In a speech wakeup process, speech recognition is a key step.

SUMMARY

Embodiments of the present disclosure provide a speech recognition method, apparatus, and device. The technical solutions are as follows:

An embodiment of the present disclosure provides a speech recognition method, performed by a terminal or a server. The method includes: obtaining speech information; and determining beginning and ending positions of a candidate speech segment in the speech information by using a weighted finite state transducer (WFST) network. The candidate speech segment is identified as corresponding to a preset keyword. The method also includes clipping the candidate speech segment from the speech information according to the beginning and ending positions of the candidate speech segment; detecting whether the candidate speech segment includes a preset keyword by using a machine learning model; and determining, upon determining that the candidate speech segment comprises the preset keyword, that the speech information comprises the preset keyword.

An embodiment of the present disclosure further provides a speech recognition device, including a processor and a memory. The processor is configured to perform: obtaining speech information; and determining beginning and ending positions of a candidate speech segment in the speech information by using a weighted finite state transducer (WFST) network. The candidate speech segment is identified as corresponding to a preset keyword. The processor is also configured to perform clipping the candidate speech segment from the speech information according to the beginning and ending positions of the candidate speech segment; detecting whether the candidate speech segment includes a preset keyword by using a machine learning model; and determining, upon determining that the candidate speech segment comprises the preset keyword, that the speech information comprises the preset keyword.

An embodiment of the present disclosure further provides a non-transitory computer-readable storage medium storing at least one instruction. The instruction is loaded and executed by a processor to implement: obtaining speech information; and determining beginning and ending positions of a candidate speech segment in the speech information by using a weighted finite state transducer (WFST) network. The candidate speech segment is identified as corresponding to a preset keyword. The instruction also cause the processor to perform: clipping the candidate speech segment from the speech information according to the beginning and ending positions of the candidate speech segment; detecting whether the candidate speech segment includes a preset keyword by using a machine learning model; and determining, upon determining that the candidate speech segment comprises the preset keyword, that the speech information comprises the preset keyword.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other drawings from the accompanying drawings without creative efforts.

DESCRIPTION OF EMBODIMENTS

Figure 1A:
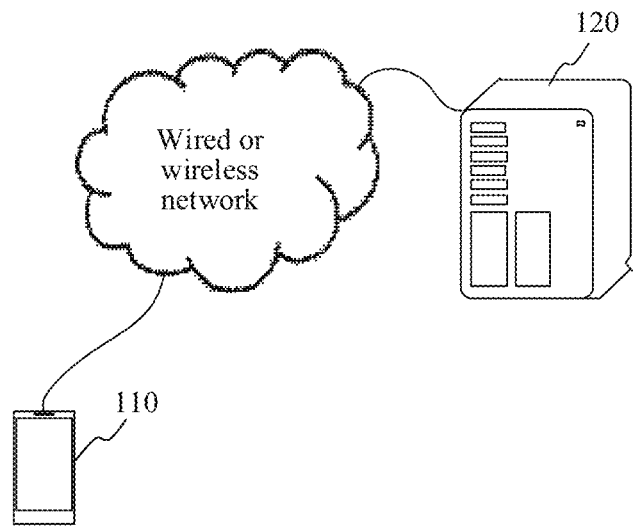
FIG. 1A is an implementation environment diagram of a speech recognition method according to an exemplary embodiment of the present disclosure.

To make the objectives, technical solutions, and advantages of the present disclosure clearer, the following further describes the implementations of the present disclosure in detail with reference to the accompanying drawings.

To facilitate understanding, the following explains terms involved in the embodiments of the present disclosure.

A machine learning model is an operational model including a large quantity of nodes (or referred to as neurons) connected to each other, each node corresponding to one policy function. A connection between each two nodes represents a weighted value of a signal passing through the connection, the weighted value being referred to as a weight. After a sample is inputted into a node of the machine learning model, an output result is outputted by each node, and the output result is used as an input sample for a next node. The machine learning model adjusts a policy function and a weight of each node through a final output result of the sample. This process is referred to as training.

A weighted finite state transducer (WFST) network is a mathematical model for representing a finite quantity of states and behaviors such as transition and action between the states. In the embodiments of the present disclosure, the WFST network includes an acoustic model, a dictionary, and a language model.

An acoustic model is a mathematical model for outputting a hidden state of a corresponding maximum posterior probability according to speech information. The hidden state may be a phoneme, or may be a phonetic unit smaller than the phoneme. The acoustic model in the embodiments of the present disclosure is a hidden Markov-deep neural network model.

A phoneme is a minimum phonetic unit obtained through division according to a natural attribute of speech. In terms of an acoustic property, the phoneme is the minimum phonetic unit obtained through division from a perspective of sound quality. In terms of a physiologic property, one pronunciation action forms one phoneme.

A hidden Markov model (HMM) is a statistical analysis model, used for describing a Markov process including a hidden unknown parameter. In the HMM, a state is not directly visible, and some variables that are affected by the state are visible.

A multilayer perceptron (MLP) is a feedforward neural network that maps a group of input vectors to a group of output vectors in a non-linear manner. The MLP may perform training by using a back-propagation algorithm.

A deep neural network (DNN) is a machine learning model, and is an MLP including more than two hidden layers. Other than an input node, each node is a neuron with a non-linear activation function. Like the MLP, the DNN may perform training by using a back-propagation algorithm.

A convolutional neural network (CNN) is a machine learning model, including at least two cascaded convolutional layers, a fully connected (FC) layer on the top, and a Softmax function. One pooling layer is included behind each convolutional layer. The Softmax function is also referred to as a normalized exponential function, or is referred to as a Softmax function. The Softmax function can "compress" a K-dimension vector z having any real number into another k-dimension real vector σ(z) so that a range of each element is (0, 1), and a sum of all elements is 1.

The Softmax function is widely applied to image recognition and speech recognition by reducing a quantity of parameters of a model by sharing parameters.

In some embodiments, a speech recognition method includes: performing feature extraction on speech information, converting the speech information into corresponding text information by using a WFST network, and detecting whether the text information includes a preset keyword.

In a process of converting the speech information into the corresponding text information, semantic recognition needs to be performed on the speech information. Due to a limitation of the WFST network, speech information without semantics but similar to the preset keyword, such as noise or background music sound, is recognized as speech information having semantics. Consequently, an electronic device is woken up by mistake, resulting in relatively low recognition accuracy.

Figure 1B:
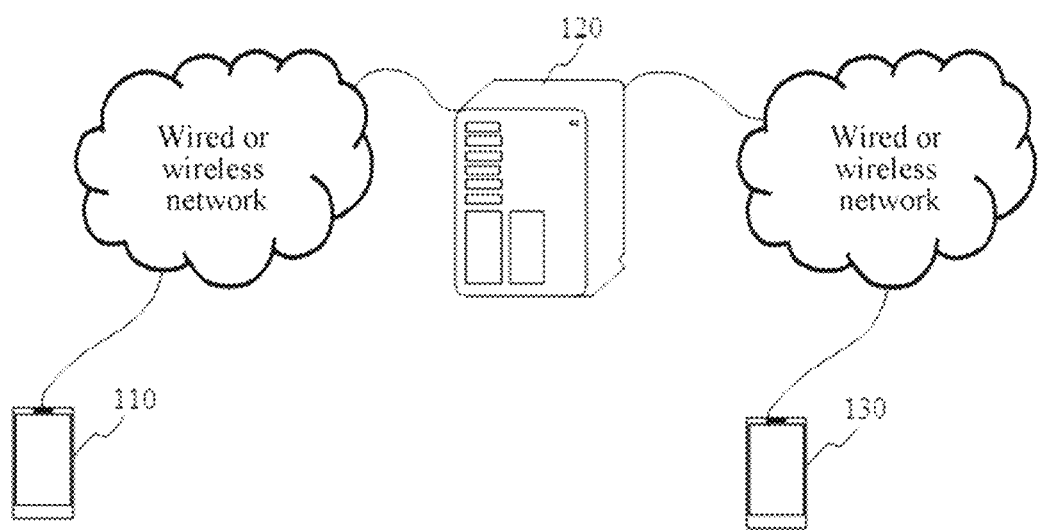
FIG. 1B is an implementation environment diagram of a speech recognition method according to an exemplary embodiment of the present disclosure.

FIG. 1A and FIG. 1B are implementation environment diagrams of a speech recognition method according to an exemplary embodiment of the present disclosure.

FIG. 1A is a first possible implementation environment according to an embodiment of the present disclosure. The implementation environment includes a terminal 110 and a server 120. The terminal 110 establishes a connection with the server 120 by using a wired or wireless network.

In some embodiments, the terminal 110 obtains speech information, and the server 120 performs recognition on the speech information and instructs the terminal 110 to lift a dormant state and/or a lock screen state.

A voice activity detection unit of the terminal 110 determines whether a user sound exists in a noise-free environment. If it is determined that the user sound exists, a recording unit is activated to record the user sound and obtain a corresponding original speech signal, and the original speech signal is transmitted to the server 120 by using the wired or wireless network.

The server 120 performs initial feature extraction on the original speech signal to obtain the speech information, and detects whether the speech information includes a preset keyword; clips, in a case that the speech information includes the preset keyword, a candidate speech segment from the speech information, where the candidate speech segment is a speech information segment corresponding to the preset keyword; performs secondary verification on the candidate speech segment, and detects whether the candidate speech segment includes the preset keyword; and transmits a wakeup instruction to the terminal 110 in a case that the candidate speech segment includes the preset keyword.

After receiving the wakeup instruction transmitted by the server 120, the terminal 110 lifts the dormant state and/or the lock screen state of the terminal according to the wakeup instruction.

FIG. 1B is a second possible implementation environment according to an embodiment of the present disclosure. The implementation environment includes a terminal 110, a terminal 130, and a server 120. The terminal 110 establishes a connection with the server 120 by using a wired or wireless network, and the terminal 130 establishes a connection with the server 120 by using a wired or wireless network. In some embodiments, the terminal 110 obtains speech information, and the server 120 performs recognition on the speech information and instructs the terminal 130 to lift a dormant state and/or a lock screen state.

A voice activity detection unit of the terminal 110 determines whether a user sound exists in a noise-free environment. If it is determined that the user sound exists, a recording unit is activated to record the user sound and obtain a corresponding original speech signal, and the original speech signal is transmitted to the server 120 by using the wired or wireless network.

The server 120 performs initial feature extraction on the original speech signal to obtain the speech information, and detects whether the speech information includes a preset keyword; clips, in a case that the speech information includes the preset keyword, a candidate speech segment from the speech information, where the candidate speech segment is a speech information segment corresponding to the preset keyword; performs secondary verification on the candidate speech segment, and detects whether the candidate speech segment includes the preset keyword; and transmits a wakeup instruction to the terminal 130 in a case that the candidate speech segment includes the preset keyword.

After receiving the wakeup instruction transmitted by the server 120, the terminal 130 lifts the dormant state and/or the lock screen state of the terminal according to the wakeup instruction.

In an embodiment, the terminal 110 obtains speech information, performs recognition on the speech information, and lifts a dormant state and/or a lock screen state of the terminal.

A voice activity detection unit of the terminal 110 determines whether a user sound exists in a noise-free environment. If it is determined that the user sound exists, a recording unit is activated to record the user sound and obtain an original speech signal. Initial feature extraction is performed on the original speech signal to obtain the speech information, and whether the speech information includes a preset keyword is detected. In a case that the speech information includes the preset keyword, a candidate speech segment is clipped from the speech information. The candidate speech segment is a speech information segment corresponding to the preset keyword. Secondary verification is performed on the candidate speech segment, and whether the candidate speech segment includes the preset keyword is detected. In a case that the candidate speech segment includes the preset keyword, the dormant state and/or the lock screen state of the terminal is lifted.

The terminal may be an electronic device including the voice activity detection unit and the recording unit, and may be a mobile phone, a tablet computer, an ebook reader, a laptop portable computer, a desktop computer, an intelligent speaker, an intelligent robot, an in-vehicle control center, or the like.

A speech recognition process according to the disclosed embodiments may be deployed in the cloud to provide wake-up services for various client devices, and may also be used in customizing offline services according to different hardware devices. Beneficial effects of the disclosed technical solution includes: stable low-latency output, flexible and diverse deployment methods, and efficient and accurate performance.

Figure 2:
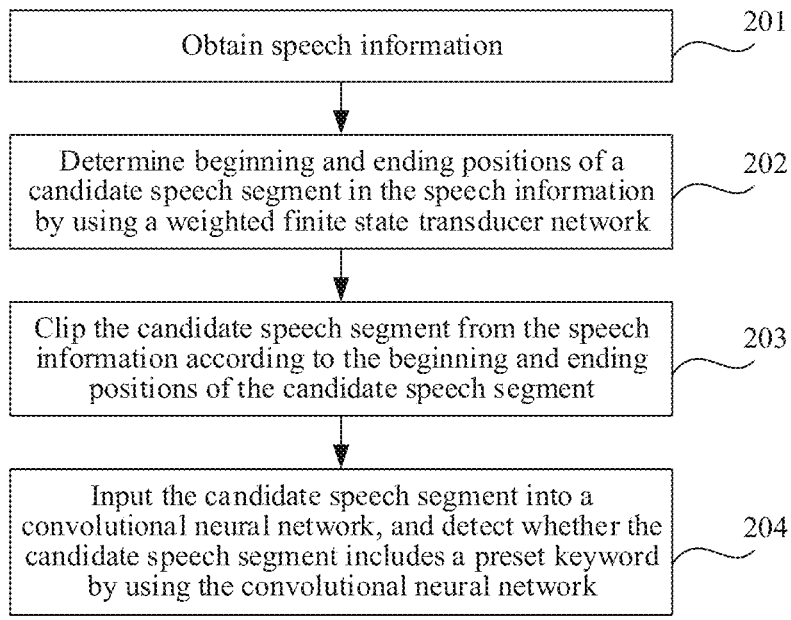
FIG. 2 is a method flowchart of a speech recognition method according to an exemplary embodiment of the present disclosure.

FIG. 2 is a method flowchart of a speech recognition method according to an exemplary embodiment of the present disclosure. The method may be applied to the server 120 shown in FIG. 1A and FIG. 1B, or may be applied to a terminal. The method includes:

Step 201: Obtain speech information.

The server receives an original speech signal transmitted by the terminal, and performs initial feature extraction on the original speech signal, to obtain the speech information.

For example, after determining that a user sound exists, the terminal records the user sound to obtain an original speech signal, and transmits the original speech signal to the server by using a wired or wireless network. The server receives the original speech signal.

Step 202. Determine beginning and ending positions of a candidate speech segment in the speech information.

For example, the server obtains language information of a maximum posterior probability corresponding to the speech information by using a WFST network. In a case that the language information includes a preset keyword, beginning and ending positions of a candidate speech segment corresponding to the preset keyword in the speech information are determined.

If the speech information is a time domain function, the beginning and ending positions are a beginning time and an ending time of the candidate speech segment in the speech information. If the speech information is a frequency domain function, the beginning and ending positions are a beginning frequency and an ending frequency of the candidate speech segment in the speech information.

The candidate speech segment includes at least one frame of speech segment. For example, the preset keyword is "kai qi", and the language information of the maximum posterior probability corresponding to the speech information that is obtained by the server by using the WFST network includes "kai qi". "kai" corresponds to a speech segment 1, and "qi" corresponds to a speech segment 2. A beginning time of the speech segment 1 is t1, and an ending time is t2. A beginning time of the speech segment 2 is t3, and an ending time is t4. If t1 is earlier than t3, and t4 is later than t2, the candidate speech segment is a segment, in the speech information, whose beginning time is t1 and ending time is t4. That is, the beginning and ending positions of the candidate speech segment in the speech information are determined to be from t1 to t4.

Step 203. Clip the candidate speech segment from the speech information according to the beginning and ending positions of the candidate speech segment.

The server clips the candidate speech segment from the speech information according to the beginning and ending positions of the candidate speech segment in the speech information.

Step 204. Input the candidate speech segment into a machine learning model, and detect whether the candidate speech segment includes a preset keyword by using the machine learning model.

The machine learning model includes a CNN or a WFST network. After performing coarse positioning on the candidate speech segment by using the WFST network, the server may detect the candidate speech segment by using the CNN, or detect the candidate speech segment by using the WFST network. For example, the server performs convolutional processing on the candidate speech segment by using a first convolutional layer in the CNN, to obtain a first high-level semantic feature; inputs the first high-level semantic feature into a first pooling layer, to obtain a primary compressed high-level semantic feature; inputs the primary compressed high-level semantic feature into a second convolutional layer, to obtain a second high-level semantic feature; inputs the second high-level semantic feature into a second pooling layer, to obtain a secondary compressed high-level semantic feature; and so on. After a plurality of times of repeated convolutional processing and pooling processing are performed, high-level semantic features of the candidate speech segment are obtained through extraction.

For example, the server obtains language information of a maximum posterior probability corresponding to the candidate speech segment by using the WFST network, and detects whether the language information includes a preset keyword.

Step 205. Determine, in a case that the candidate speech segment includes the preset keyword, that the speech information includes the preset keyword.

For example, if the CNN outputs a result that the candidate speech segment includes the preset keyword, the server determines that the speech information includes the preset keyword.

For example, if the language information of the maximum posterior probability corresponding to the candidate speech segment includes the preset keyword, the server determines that the speech information includes the preset keyword.

Detecting the candidate speech segment by using the WFST network is time-consuming, and compared with verifying the candidate speech segment by using the CNN, accuracy is relatively low.

In conclusion, in some embodiments of the present disclosure, a candidate speech segment that is coarsely positioned by a WFST network is verified by using a machine learning model, and whether the candidate speech segment includes a preset keyword is determined, to resolve a problem that false wakeup is caused because speech information without semantics is recognized as speech information having semantics in the related art, thereby improving accuracy of speech recognition. The disclosed technical solution combines initial positioning using HMM-DNN and second-time verification using CNN, which improves the deficiencies of the existing voice wake-up technology, and can stably output the voice wake-up service with high recall and low false wake-up rate.

Figure 3:
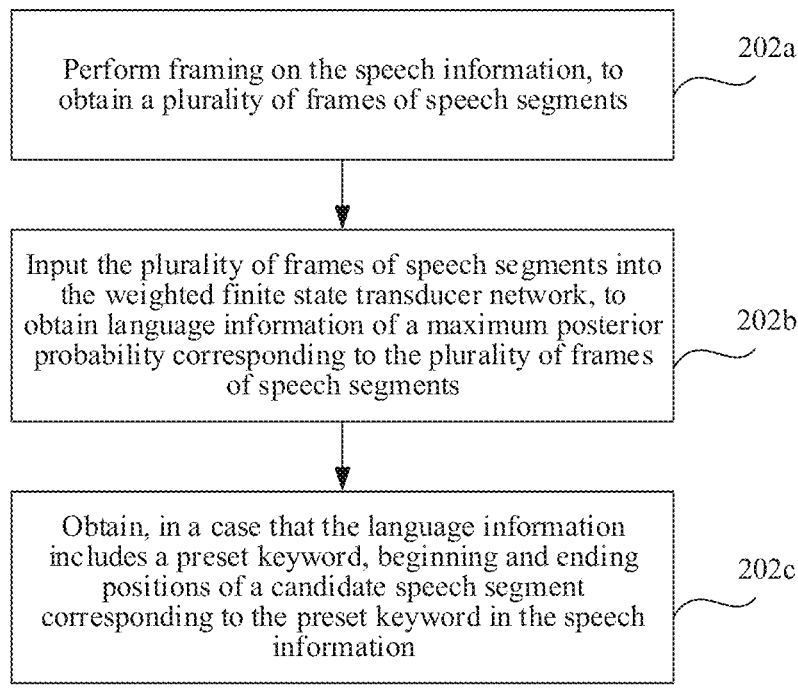
FIG. 3 is a method flowchart of a speech recognition method according to an exemplary embodiment of the present disclosure.

FIG. 3 is a method flowchart of a speech recognition method according to an exemplary embodiment of the present disclosure. The method may be applied to the server 120 shown in FIG. 1A and FIG. 1B, or may be applied to a terminal. The method may be an implementation of step 202 in the embodiment in FIG. 2, and includes:

Step 202a. Perform framing on the speech information, to obtain a plurality of frames of speech segments.

For example, the server performs framing on the speech information by using a moving window, to obtain a plurality of frames of speech segments. The moving window has a window length and a step length that are preset, and each frame of speech segment has corresponding beginning and ending positions and a corresponding sequence number index.

Figure 4:
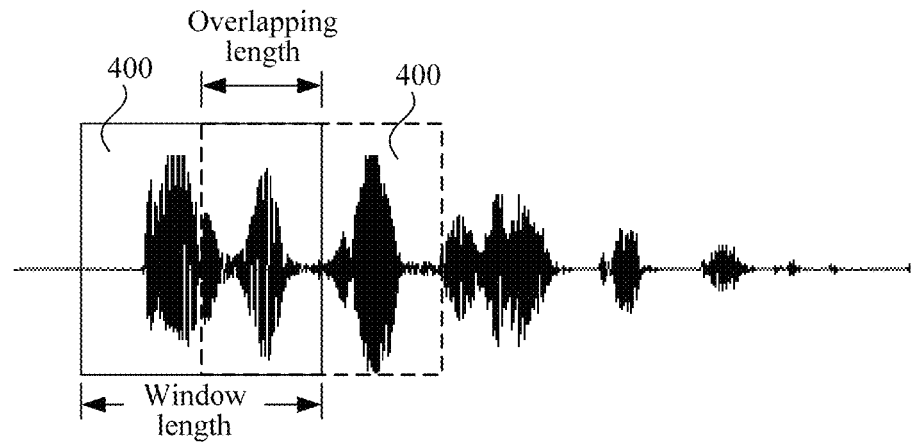
FIG. 4 is a schematic diagram of performing framing on speech information according to an exemplary embodiment of the present disclosure.

If the speech information is a time domain function, and the window length and the step length use a preset time length as a unit. As shown in FIG. 4, a window length of a moving window 400 is 20 milliseconds, and a step length is 10 milliseconds, so that the speech information is divided by using the moving window 400 into frames of speech information each of which has a length of 20 milliseconds, and an overlapping length between a plurality of frames of speech segments is 10 milliseconds.

Step 202b. Input the plurality of frames of speech segments into the WFST network, to obtain language information of a maximum posterior probability corresponding to the plurality of frames of speech segments.

Figure 5:
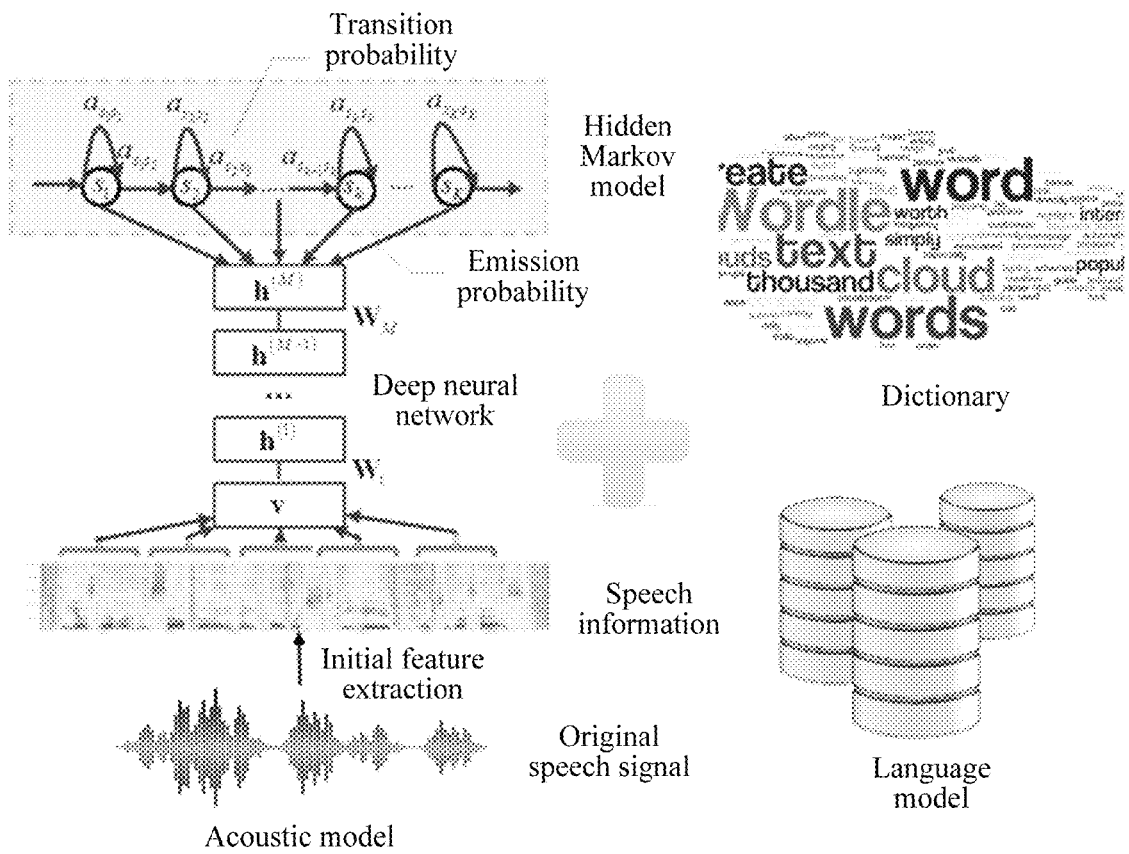
FIG. 5 is an architectural diagram of a WFST network according to an exemplary embodiment of the present disclosure.

For example, as shown in FIG. 5, the WFST network includes an acoustic model, a dictionary, and a language model. The acoustic model may be formed by a DNN and an HMM.

The DNN includes at least two cascaded DNN layers and a fully connected layer, and may output, according to an inputted speech segment, a mathematical model of a posterior probability of a hidden state corresponding to the speech segment. V in FIG. 5 represents a speech segment inputted into the DNN, and W represents a parameter of each neural network layer of the DNN layers, for example, W1 represents a parameter of the first neural network layer, and WM represents a parameter of the $M^{th}$ neural network layer; h(i) represents an output result of the $i^{th}$ neural network layer of the DNN layers, for example, h(1) represents an output result of the first neural network layer, and h(M) represents an output result of the $M^{th}$ neural network layer; Si represents the $i^{th}$ type of hidden state, for example, the first type of hidden state S1 or the $K^{th}$ type of hidden state SK; and $a_{s_i s_j}$ represents a transition probability between the $i^{th}$ type of hidden state Si and the $i^{th}$ type of hidden state Sj, for example, as1s2 represents a transition probability between the first type of hidden state S1 and the second type of hidden state S2.

The HMM is a mathematical model outputting a hidden state corresponding to a speech segment according to a posterior probability of the hidden state corresponding to the speech segment.

The dictionary is a correspondence between a phoneme and a word. A character or a word of a maximum posterior probability corresponding to at least one phoneme may be obtained by inputting the at least one phoneme into the dictionary.

The language model is a correspondence between a word and syntax and/or grammar. Language information of a maximum posterior probability corresponding to a word may be obtained by inputting a character or the word into the language model. The language information may be a word, or may be a sentence.

The server inputs the plurality of frames of speech segments into the DNN and performs feature extraction, to obtain a posterior probability of a hidden state corresponding to each frame of speech segment; obtains the hidden state corresponding to each frame of speech segment according to the posterior probability of the hidden state corresponding to each frame of speech segment by using the HMM; obtains one or more phonemes corresponding to the plurality of frames of speech segments according to the hidden state corresponding to each frame of speech segment; obtains a character or a word of a maximum posterior probability corresponding to the plurality of frames of speech segments by using the dictionary (e.g., hidden state sequence corresponding to a sequence of one or more phonemes); and obtains language information of the maximum posterior probability corresponding to the plurality of frames of speech segments according to the character or the word of the maximum posterior probability corresponding to the plurality of frames of speech segments by using the language model.

Because the maximum posterior probability is selected in the foregoing conversion process, the language information of the maximum posterior probability corresponding to the plurality of frames of speech segments is obtained after the plurality of frames of speech segments are inputted into the WFST network.

Step 202c. Obtain, in a case that the language information includes a preset keyword, beginning and ending positions of a candidate speech segment corresponding to the preset keyword in the speech information. In this step, the beginning and ending positions of the candidate speech segment corresponding to the preset keyword in the speech information are determined according to a phoneme corresponding to the preset keyword.

The server detects whether the language information of the maximum posterior probability corresponding to the plurality of frames of speech segments includes the preset keyword. In a case of determining that the language information includes the preset keyword, the beginning and ending positions of the candidate speech segment corresponding to the preset keyword in the speech information are obtained.

For example, one frame of speech segment corresponds to one hidden state, at least one hidden state corresponds to one phoneme, and at least one phoneme corresponds to one word. A candidate speech segment corresponding to a keyword is obtained by using a phoneme corresponding to each word in the preset keyword. Each speech segment is marked with a sequence number index when framing is performed on the speech information, and each speech segment has an attribute of beginning and ending positions, so that beginning and ending positions of the candidate speech segment in the speech information may be obtained.

In conclusion, in some embodiments of the present disclosure, language information of a maximum posterior probability corresponding to a plurality of frames of speech segments is obtained by inputting the plurality of frames of speech segments into a WFST network. In a case that the language information includes a preset keyword, beginning and ending positions of a candidate speech segment corresponding to the preset keyword in the speech information are obtained. Therefore, recognition accuracy of the candidate speech segment can be improved.

Further, in some embodiments of the present disclosure, a posterior probability of a hidden state corresponding to each frame of speech segment is obtained by inputting the plurality of frames of speech segments into a DNN. Because the DNN has a relatively strong feature extraction capability, the posterior probability of the hidden state corresponding to each frame of speech segment that is obtained by using the DNN is more accurate, thereby improving the recognition accuracy of the candidate speech segment.

Figure 6:
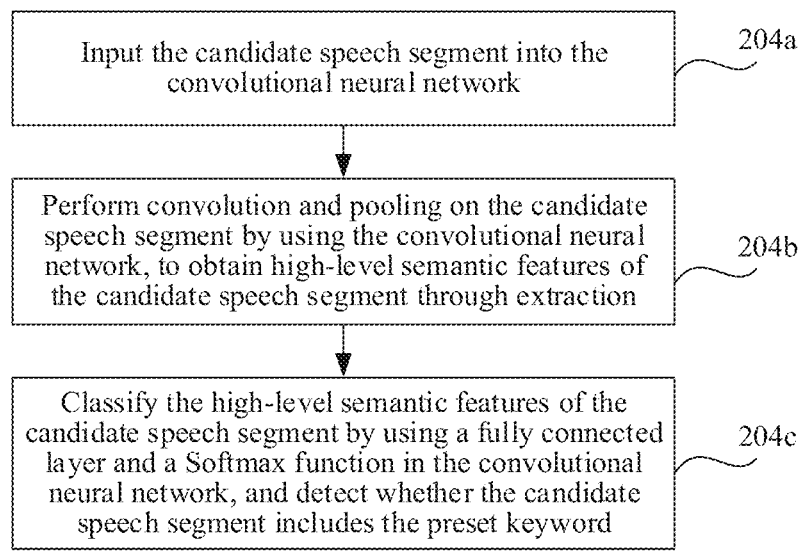
FIG. 6 is a method flowchart of a speech recognition method according to an exemplary embodiment of the present disclosure.

FIG. 6 is a method flowchart of a speech recognition method according to an exemplary embodiment of the present disclosure. The method may be applied to the server 120 shown in FIG. 1A and FIG. 1B, or may be applied to a terminal. The method may be an implementation of step 204 in the embodiment in FIG. 2, and includes:

Step 204a. Input the candidate speech segment into the CNN.

After obtaining the candidate speech segment by using the method in the embodiment in FIG. 2 or the embodiment in FIG. 3, the server inputs the candidate speech segment into the CNN.

Figure 7A:
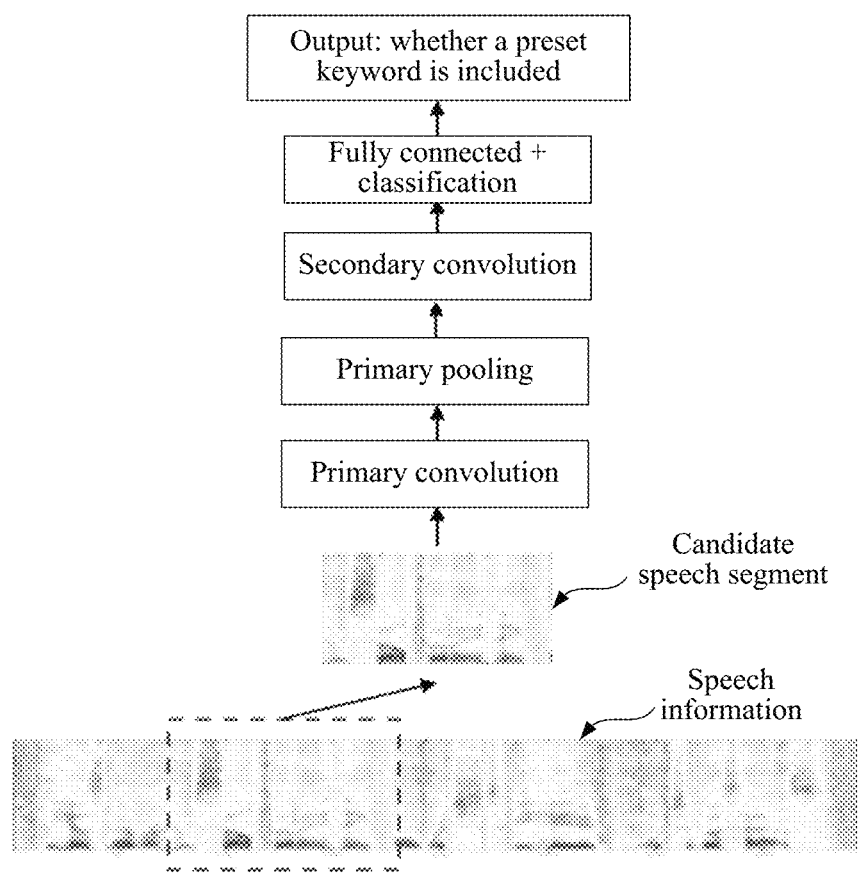
FIG. 7A is an architectural diagram of a convolutional neural network (CNN) according to an exemplary embodiment of the present disclosure.

For example, as shown in FIG. 7A, the CNN includes at least two convolutional layers, one fully connected layer, and one Softmax function. One pooling layer is further included behind each convolutional layer. Two convolutional layers are used as an example for description in the figure, but it does not mean that the CNN includes only two convolutional layers.

Step 204b. Perform convolution and pooling on the candidate speech segment by using the CNN, to obtain high-level semantic features of the candidate speech segment through extraction.

For example, the server performs convolutional processing on the candidate speech segment by using a first convolutional layer in the CNN, to obtain a first high-level semantic feature; inputs the first high-level semantic feature into a first pooling layer, to obtain a primary compressed high-level semantic feature; inputs the primary compressed high-level semantic feature into a second convolutional layer, to obtain a second high-level semantic feature; inputs the second high-level semantic feature into a second pooling layer, to obtain a secondary compressed high-level semantic feature; and so on. After a plurality of times of repeated convolutional processing and pooling processing are performed, high-level semantic features of the candidate speech segment are obtained through extraction.

Step 204c. Classify the high-level semantic features of the candidate speech segment by using a fully connected layer and a Softmax function in the CNN, and detect whether the candidate speech segment includes the preset keyword.

For example, high-level semantic features of the candidate speech segment are obtained through processing of a plurality of convolutional layers and a plurality of pooling layers, and the high-level semantic features extracted in each convolutional layer and each pooling layer are connected by using the fully connected layer, and are transported to the Softmax function. The Softmax function performs classification on the high-level semantic features, and outputs a result about whether the candidate speech segment includes the preset keyword.

In some embodiments, the CNN network structure can be adjusted according to different tasks. For the input segment (i.e., candidate speech segment), the CNN network extracts high-level semantic features by combining convolution and pooling. For example, the fully connected layer and the SoftMax combination at the top layer(s) of the CNN model may be equivalent to a traditional classifier, which can classify semantic features received and extracted by the lower layers of the network, to determine whether the candidate speech segment located in the first step (e.g., by using HMM-DNN model) actually contains the wakeup word.

Figure 7B:
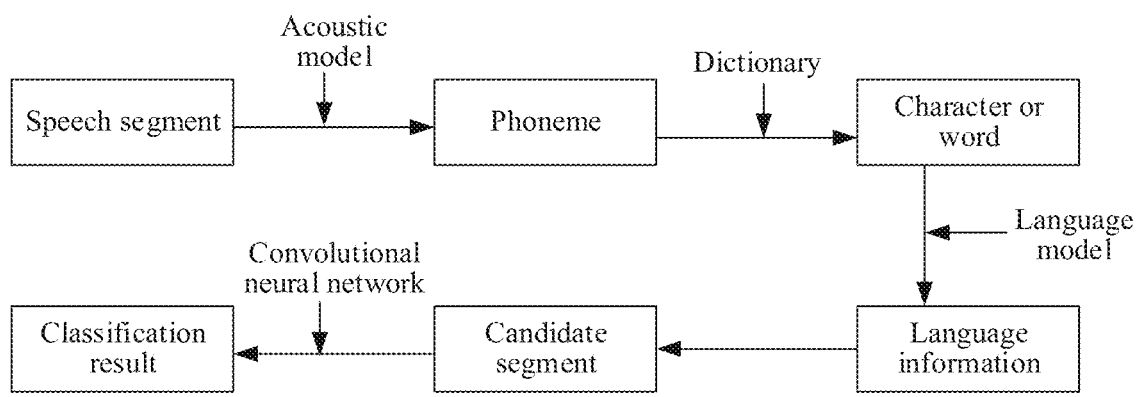
FIG. 7B is an entire architectural diagram of a speech recognition method according to an exemplary embodiment of the present disclosure.

FIG. 7B is an entire architectural diagram of a speech recognition method according to an embodiment of the present disclosure. As shown in the figure, a phoneme of a maximum posterior probability corresponding to a plurality of frames of speech segments is obtained by inputting the plurality of frames of speech segments into an acoustic model, a character or a word of the maximum posterior probability corresponding to the plurality of frames of speech segments is obtained by using a dictionary, and the word or a sentence of the maximum posterior probability corresponding to the plurality of frames of speech segments is obtained by using a language model, thereby detecting whether the word or the sentence includes a preset keyword. If the word or the sentence includes the preset keyword, a candidate speech segment corresponding to the preset keyword is clipped. The candidate speech segment is inputted into a CNN for verification, and a final verification result is outputted.

In conclusion, in some embodiments of the present disclosure, high-level semantic features of the candidate speech segment are obtained through extraction by inputting the candidate speech segment into the CNN to perform convolution and pooling, and the extracted high-level semantic features are connected by using a fully connected layer and are transported to a Softmax function for classification, to obtain a result about whether the candidate speech segment includes the preset keyword. Because the candidate speech segment is obtained through initial positioning by using a WFST network, accuracy of speech recognition is improved on the basis of ensuring a recognition rate.

Figure 8:
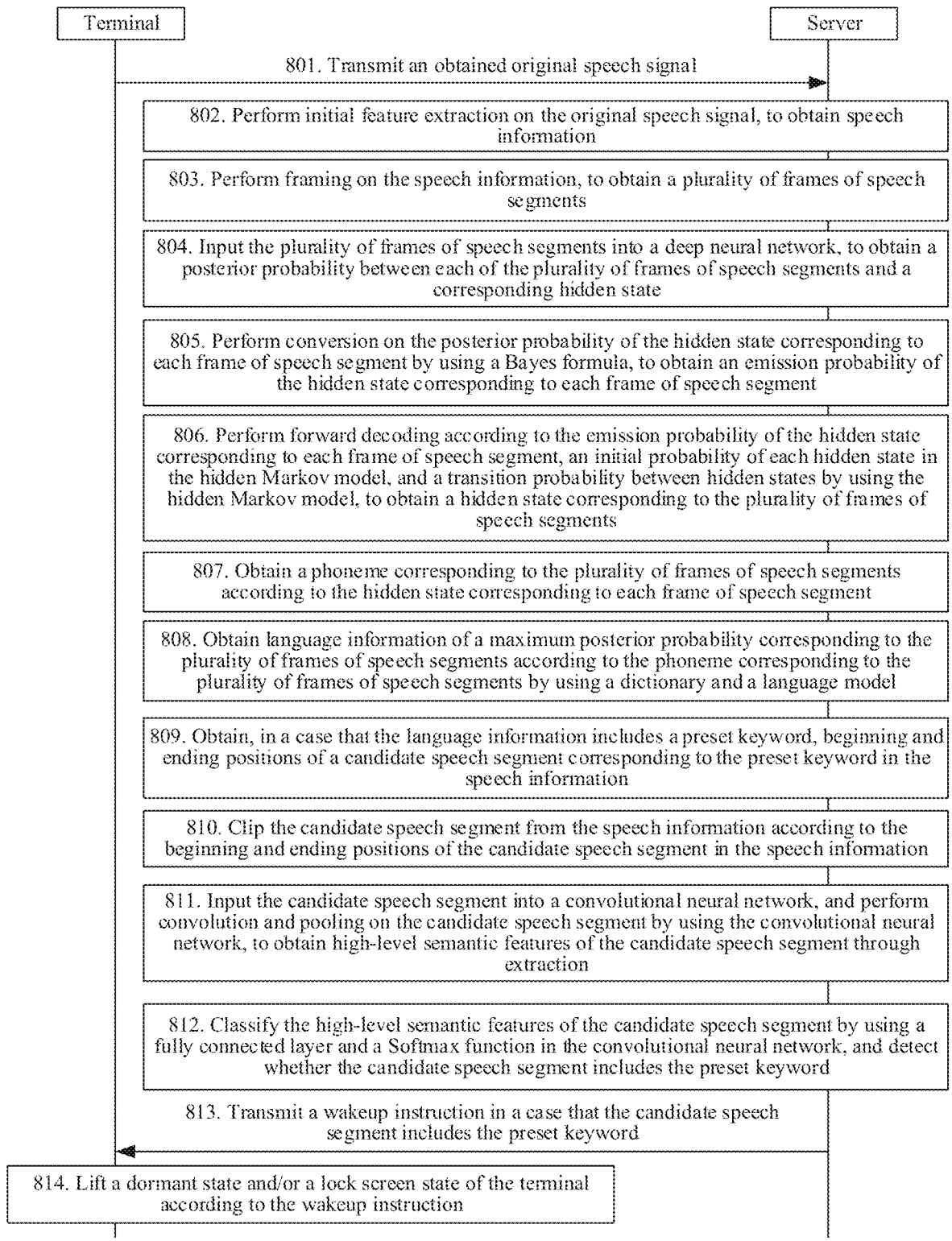
FIG. 8 is a method flowchart of a speech recognition method according to an exemplary embodiment of the present disclosure.

FIG. 8 is a method flowchart of a speech recognition method according to an exemplary embodiment of the present disclosure. The method may be applied to the implementation environment shown in FIG. 1A, and the method includes:

Step 801. A terminal transmits an obtained original speech signal to a server.

For example, a voice activity detection module of the terminal determines whether a user sound exists. If it is determined that the user sound exists, a recording module is activated to record the user sound and obtain a corresponding original speech signal, and the original speech signal is transmitted to the server by using a wired or wireless network.

Step 802. The server performs initial feature extraction on the original speech signal, to obtain speech information.

The server performs initial feature extraction on the received original speech signal, to obtain speech information. The speech information is a time domain function or frequency domain function.

Step 803. The server performs framing on the speech information, to obtain a plurality of frames of speech segments.

For example, the server performs framing on the speech information by using a moving window, to obtain a plurality of frames of speech segments. The moving window has a window length and a step length that are preset, and each frame of speech segment has corresponding beginning and ending positions and a corresponding sequence number index.

Step 804. The server inputs the plurality of frames of speech segments into a DNN, to obtain a posterior probability between each of the plurality of frames of speech segments and a corresponding hidden state.

The DNN outputs a posterior probability between each frame of speech segment and a corresponding hidden state, so that the hidden state corresponding to each frame of speech segment still cannot be obtained by using the DNN, and forward decoding needs to be performed on each frame of speech segment by using an HMM.

Step 805. The server performs conversion on the posterior probability of the hidden state corresponding to each frame of speech segment by using a Bayes formula, to obtain an emission probability of the hidden state corresponding to each frame of speech segment.

For example, emission probabilities of hidden states corresponding to speech segments are needed when forward decoding is performed on each frame of speech segment by using the HMM. The server performs conversion on the posterior probability of the hidden state corresponding to each frame of speech segment by using a Bayes formula, to obtain an emission probability of the hidden state corresponding to each frame of speech segment.

Step 806. The server performs forward decoding according to the emission probability of the hidden state corresponding to each frame of speech segment, an initial probability of each hidden state in the HMM, and a transition probability between hidden states by using the HMM, to obtain a hidden state of a maximum posterior probability corresponding to the plurality of frames of speech segments.

In the HMM, the initial probability of each hidden state and the transition probability between hidden states are parameters that have been trained. The forward decoding is performed on each frame of speech segment according to the emission probability of the hidden state corresponding to each frame of speech segment that is obtained in step 804, with reference to the initial probability of each hidden state and the transition probability between hidden states by using the HMM, to obtain the hidden state of the maximum posterior probability corresponding to the plurality of frames of speech segments.

Step 807. The server obtains a phoneme corresponding to the plurality of frames of speech segments according to the hidden state corresponding to each frame of speech segment.

The phoneme is formed by at least one hidden state, and the server obtains the phoneme corresponding to the plurality of frames of speech segments according to the hidden state corresponding to each frame of speech segment.

Step 808. The server obtains language information of the maximum posterior probability corresponding to the plurality of frames of speech segments according to the phoneme corresponding to the plurality of frames of speech segments with reference to a dictionary and a language model.

A word is formed by at least one phoneme, and the dictionary includes a correspondence between the word and the phoneme. The server obtains a character or a word of the maximum posterior probability corresponding to the plurality of frames of speech segments by using the dictionary, and obtains the language information of the maximum posterior probability corresponding to the plurality of frames of speech segments according to the character or the word of the maximum posterior probability corresponding to the plurality of frames of speech segments by using the language model. The language information may be a word, or may be a sentence. The language model is a correspondence between a word and grammar and/or syntax.

The correspondence between the word and the phoneme in the dictionary and the correspondence between the word and grammar and/or syntax in the language model are a type of probability correspondence. The language information of the maximum posterior probability corresponding to the plurality of frames of speech segments that is obtained by the server according to the phoneme corresponding to the plurality of frames of speech segments by using the dictionary and the language model is the language information of the maximum posterior probability corresponding to the plurality of frames of speech segments that is obtained by performing pathfinding according to a maximum probability.

Step 809. The server obtains, in a case that the language information includes a preset keyword, beginning and ending positions of a candidate speech segment corresponding to the preset keyword in the speech information. In this step, the server determines the beginning and ending positions of the candidate speech segment corresponding to the preset keyword in the speech information according to a phoneme corresponding to the preset keyword.

The server detects whether the language information of the maximum posterior probability corresponding to the plurality of frames of speech segments includes the preset keyword. In a case that the language information includes the preset keyword, the beginning and ending positions of the candidate speech segment corresponding to the preset keyword in the speech information are determined. If the language information of the maximum posterior probability corresponding to the plurality of frames of speech segments does not include the preset keyword, this step is stopped.

Step 810. The server clips the candidate speech segment from the speech information according to the beginning and ending positions of the candidate speech segment in the speech information.

The server clips the candidate speech segment from the speech information according to the beginning and ending positions of the candidate speech segment in the speech information.

Step 811. The server inputs the candidate speech segment into a CNN, and performs convolution and pooling on the candidate speech segment by using the CNN, to obtain high-level semantic features of the candidate speech segment through extraction.

For example, the server inputs the clipped candidate speech segment into the CNN, and performs convolutional processing on the candidate speech segment by using a first convolutional layer in the CNN, to obtain a first high-level semantic feature; inputs the first high-level semantic feature into a first pooling layer, to obtain a primary compressed high-level semantic feature; inputs the primary compressed high-level semantic feature into a second convolutional layer, to obtain a second high-level semantic feature; inputs the second high-level semantic feature into a second pooling layer, to obtain a secondary compressed high-level semantic feature; and so on. After a plurality of times of repeated convolutional processing and pooling processing are performed, high-level semantic features of the candidate speech segment are obtained through extraction.

Step 812. The server classifies the high-level semantic features of the candidate speech segment by using a fully connected layer and a Softmax function in the CNN, and detects whether the candidate speech segment includes the preset keyword.

For example, high-level semantic features of the candidate speech segment are obtained through processing of a plurality of convolutional layers and a plurality of pooling layers, and the high-level semantic features extracted in each convolutional layer and each pooling layer are connected by using the fully connected layer, and are transported to the Softmax function. The Softmax function performs classification on the high-level semantic features, and outputs a result about whether the candidate speech segment includes the preset keyword.

Step 813. The server transmits a wakeup instruction to the terminal in a case that the candidate speech segment includes the preset keyword.

In a case that a result outputted by the CNN is that the candidate speech segment includes the preset keyword, the server transmits a wakeup instruction to the terminal by using a wired or wireless network.

Step 814. The terminal lifts a dormant state and/or a lock screen state of the terminal according to the wakeup instruction.

After receiving the wakeup instruction transmitted by the server, the terminal lifts a dormant state and/or a lock screen state of the terminal according to the wakeup instruction.

In conclusion, in some embodiments of the present disclosure, a candidate speech segment that is coarsely positioned by a WFST network is verified by using a CNN, and whether the candidate speech segment includes a preset keyword is determined, to resolve a problem that false wakeup is caused because speech information without semantics is recognized as speech information having semantics in the related art, thereby improving accuracy of speech recognition.

Further, in some embodiments of the present disclosure, language information of a maximum posterior probability corresponding to a plurality of frames of speech segments is obtained by inputting the plurality of frames of speech segments into a WFST network. In a case that the language information includes a preset keyword, beginning and ending positions of a candidate speech segment corresponding to the preset keyword in the speech information are obtained. Therefore, recognition accuracy of the candidate speech segment can be improved.

Further, in some embodiments of the present disclosure, a posterior probability of a hidden state corresponding to each frame of speech segment is obtained by inputting the plurality of frames of speech segments into a DNN. Because the DNN has a relatively strong feature extraction capability, the posterior probability of the hidden state corresponding to each frame of speech segment that is obtained by using the DNN is more accurate, thereby improving the recognition accuracy of the candidate speech segment.

Further, in some embodiments of the present disclosure, high-level semantic features of the candidate speech segment are obtained through extraction by inputting the candidate speech segment into the CNN to perform convolution and pooling, and the extracted high-level semantic features are connected by using a fully connected layer and are transported to a Softmax function for classification, to obtain a result about whether the candidate speech segment includes the preset keyword. Because the candidate speech segment is obtained through initial positioning by using a WFST network, accuracy of speech recognition is improved on the basis of ensuring a recognition rate.

In some embodiments, when there is a shortage of computing and storage resources in some offline voice wake-up scenarios, singular value decomposition (SVD) is performed on the fully connected layer of the CNN network to reduce the number of parameters in calculation. This operation may lose some performance (within acceptable range) but can effectively reduce model size and reduce the amount of calculation.

In some embodiments, when implementing the disclosed method in some specific devices such as vehicle control center, multiple tasks may be run simultaneously (such as navigation, music playback, etc.), and computing resources may be further compressed. At this time, a fixed-point CNN model may be called which replaces floating-point operation with integer operations to reduce the dependence on computing resources and ensure the normal operation of the wake-up service.

Figure 9:
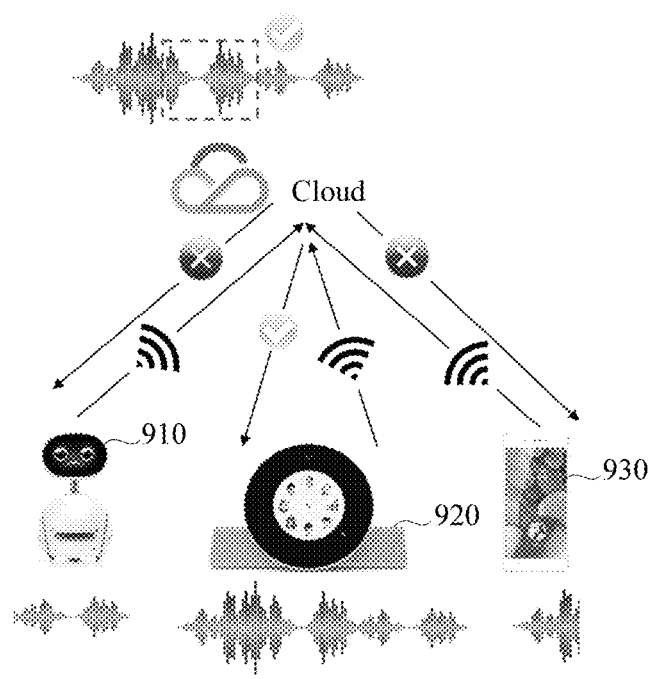
FIG. 9 is an application scenario diagram of a speech recognition method according to an exemplary embodiment of the present disclosure.
Figure 10:
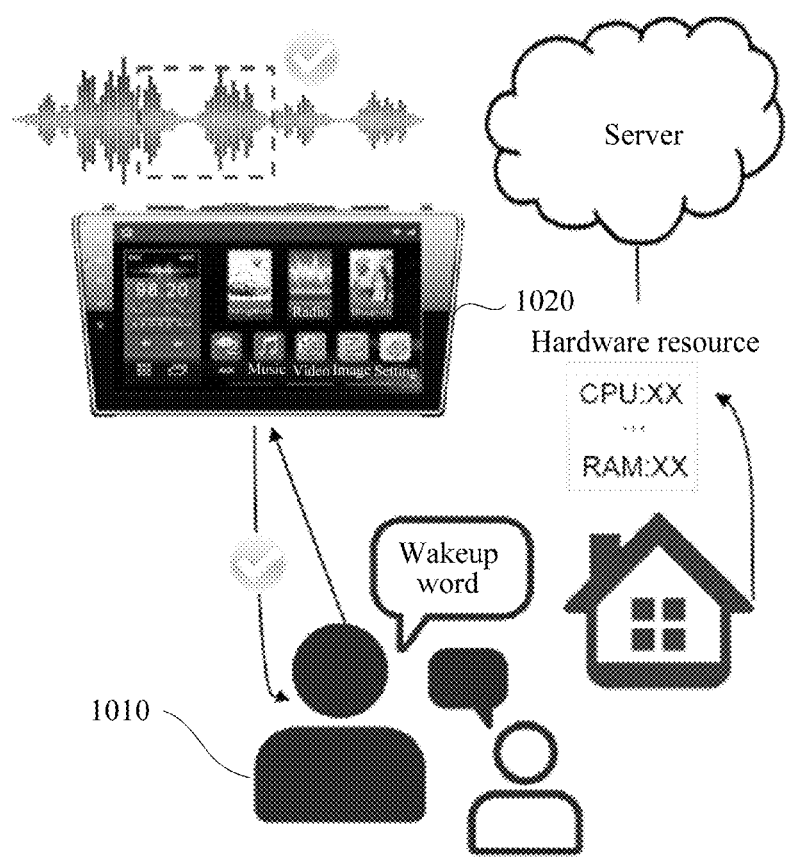
FIG. 10 is an application scenario diagram of a speech recognition method according to an exemplary embodiment of the present disclosure.

FIG. 9 and FIG. 10 show application scenarios of a speech recognition method according to an exemplary embodiment of the present disclosure.

In the application scenario in FIG. 9, terminals such as an intelligent robot 910, an intelligent speaker 920, and an intelligent mobile phone 930 transmit obtained speech information to a cloud by using a wired or wireless network. The cloud detects whether each piece of speech information includes a corresponding preset keyword by using the method in the foregoing embodiments. If each piece of speech information includes the preset keyword, the cloud transmits a wakeup instruction to a corresponding terminal, to release the terminal from a dormant state and/or a lock screen state.

FIG. 10 provides an offline speech recognition application scenario. A user 1010 speaks a wakeup word (that is, a preset keyword) to an electronic device 1020. After detecting that the user speaks the wakeup word, the electronic device 1020 obtains an original speech signal through recording, performs initial feature extraction on the original speech signal, and detects whether speech information includes the preset keyword by using the method in the foregoing embodiments. If the speech information includes the preset keyword, a dormant state and/or a lock screen state of the electronic device is lifted.

Generally, computing resources of the electronic device are limited. Customization needs to be performed for electronic devices having different hardware. The customization procedure is as follows: an electronic device manufacturer submits a hardware resource that can be allocated by an electronic device to a speech wakeup module; after receiving data submitted by the manufacturer, a server designs a model capable of running on the electronic device according to a status of the hardware resource that can be allocated by the electronic device; the model is trained by using training data that fits in with an application environment of the electronic device; a combined test and specific optimization are performed on the obtained model, and after passing the test, the model is delivered to the electronic device manufacturer for integration; and after the integration is finished, a user may wake the electronic device up in an offline environment, where a wakeup method is the same as that of an online service.

Figure 11:
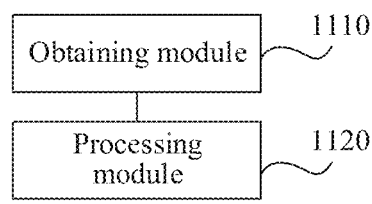
FIG. 11 is a structural block diagram of a speech recognition apparatus according to an exemplary embodiment of the present disclosure.

FIG. 11 is a structural block diagram of a speech recognition apparatus according to an exemplary embodiment of the present disclosure. As shown in the figure, the apparatus may be applied to the terminal 110, the terminal 130, or the server 120 shown in FIG. 1B. The apparatus includes an obtaining module 1110 and a processing module 1120.

The obtaining module 1110 is configured to obtain speech information.

The processing module 1120 is configured to determine beginning and ending positions of a candidate speech segment in the speech information by using a WFST network; clip the candidate speech segment from the speech information according to the beginning and ending positions; input the candidate speech segment into a machine learning model, and detect whether the candidate speech segment includes a preset keyword by using the machine learning model; and determine, in a case that the candidate speech segment includes the preset keyword, that the speech information includes the preset keyword.

In an embodiment,
the processing module 1120 is further configured to perform framing on the speech information, to obtain a plurality of frames of speech segments; and input the plurality of frames of speech segments into the WFST network, to obtain language information of a maximum posterior probability corresponding to the plurality of frames of speech segments; and the obtaining module 1110 is further configured to determine, in a case that the language information includes the preset keyword, the beginning and ending positions of the candidate speech segment corresponding to the preset keyword in the speech information, where the candidate speech segment includes at least one of the plurality of frames of speech segments.

In an embodiment, the WFST network includes a DNN, an HMM, a dictionary, and a language model.

The processing module 1120 is further configured to input the plurality of frames of speech segments into the DNN, to obtain a posterior probability of a hidden state corresponding to each of the plurality of frames of speech segments; obtain the hidden state corresponding to each frame of speech segment according to the posterior probability of the hidden state corresponding to each frame of speech segment by using the HMM; obtain a phoneme corresponding to the plurality of frames of speech segments according to the hidden state corresponding to each frame of speech segment; and obtain the language information of the maximum posterior probability corresponding to the plurality of frames of speech segments according to the phoneme corresponding to the plurality of frames of speech segments with reference to the dictionary and the language model, where the dictionary includes a correspondence between the phoneme and a word, and the language model includes a correspondence between the word and grammar and/or syntax.

In an embodiment,
the processing module 1120 is further configured to perform conversion on the posterior probability of the hidden state corresponding to each frame of speech segment by using a Bayes formula, to obtain an emission probability of the hidden state corresponding to each frame of speech segment; and perform forward decoding according to the emission probability of the hidden state corresponding to each frame of speech segment, an initial probability of each hidden state in the HMM, and a transition probability between hidden states by using the HMM, to obtain the hidden state corresponding to each frame of speech segment.

In an embodiment,
the processing module 1120 is further configured to input the candidate speech segment into a CNN; perform convolution and pooling on the candidate speech segment by using the CNN, to obtain high-level semantic features of the candidate speech segment through extraction; and classify the high-level semantic features of the candidate speech segment by using a fully connected layer and a Softmax function in the CNN, and detect whether the candidate speech segment includes the preset keyword.

Figure 12:
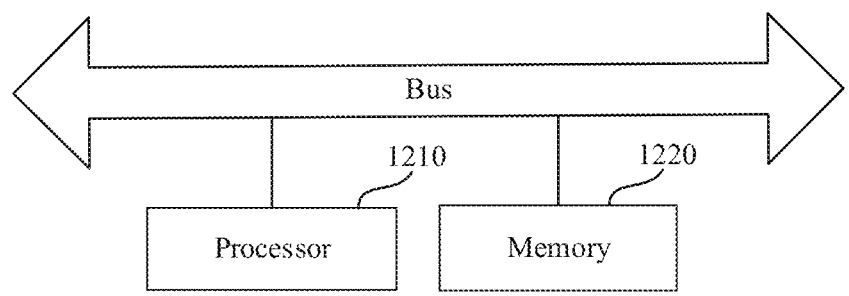
FIG. 12 is a structural block diagram of a speech recognition device according to an exemplary embodiment of the present disclosure.

FIG. 12 is a structural block diagram of a speech recognition device according to an exemplary embodiment of the present disclosure. The device includes a processor 1210 and a memory 1220.

The processor 1210 may be a central processing unit (CPU), a network processor (NP), or a combination of the CPU and the NP. The processor 1210 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 1220 is connected to the processor 1210 by using a bus or in other manners. The memory 1220 stores at least one instruction, at least one program, a code set or an instruction set. The at least one instruction, the at least one program, the code set or the instruction set is loaded and executed by the processor 1210 to implement the speech recognition method in FIG. 2, FIG. 3, FIG. 6, or FIG. 8. The memory 1220 may be a volatile memory, a non-volatile memory, or a combination thereof. The volatile memory may be a random access memory (RAM), for example, a static random access memory (SRAM) or a dynamic random access memory (DRAM). The non-volatile memory may be a read-only memory (ROM), for example, a programmable read-only memory (PROM), an erasable programmable read-only memory (EPROM), or an electrically erasable programmable read-only memory (EEPROM). The non-volatile memory may alternatively be a flash memory or a magnetic memory, for example, a magnetic tape, a floppy disk, or a hard disk. The non-volatile memory may alternatively be an optical disc.

The present disclosure further provides a computer-readable storage medium, the storage medium storing at least one instruction, at least one program, a code set or an instruction set, and the at least one instruction, the at least one program, the code set or the instruction set being loaded and executed by a processor to implement the speech recognition method according to the foregoing method embodiments.

The present disclosure further provides a computer program product including an instruction. When run on a computer, the computer program product causes the computer to perform the speech recognition method according to the foregoing aspects.

It is to be understood that "multiple" described in this specification refers to two or more. "And/or" describes an association relationship for describing associated objects and represents that three relationships may exist. For example, A and/or B may represent the following three cases: Only A exists, both A and B exist, and only B exists. The character "/" in this specification generally indicates an "or" relationship between the associated objects.

The sequence numbers of the foregoing embodiments of the present disclosure are merely for the convenience of description, and do not imply the preference among the embodiments.

A person of ordinary skill in the art may understand that all or some of the steps of the embodiments may be implemented by hardware or a program instructing related hardware. The program may be stored in a computer-readable storage medium. The storage medium may be: a read-only memory, a magnetic disk, or an optical disc.

The foregoing descriptions are merely exemplary embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A speech recognition method, performed by a computing device, and comprising:
   obtaining speech information;
   determining beginning and ending positions of a candidate speech segment in the speech information by using a weighted finite state transducer (WFST) network, the WFST network including a deep neural network (DNN), a hidden Markov model (HMM), a dictionary, and a language model, and the candidate speech segment being identified as corresponding to a preset keyword;
   clipping the candidate speech segment from the speech information according to the beginning and ending positions;
   detecting whether the candidate speech segment comprises the preset keyword by using a convolutional neural network (CNN); and
   determining, upon determining that the candidate speech segment comprises the preset keyword, that the speech information comprises the preset keyword.

2. The method according to claim 1, wherein the determining beginning and ending positions of a candidate speech segment in the speech information by using a weighted finite state transducer (WFST) network comprises:
   performing framing on the speech information, to obtain a plurality of frames of speech segments; and
   inputting the plurality of frames of speech segments into the WFST network.

3. The method according to claim 2, wherein inputting the plurality of frames of speech segments into the WFST network comprises:
   inputting the plurality of frames of speech segments into the DNN, to obtain a posterior probability of a hidden state corresponding to each of the plurality of frames of speech segments; and
   obtaining the hidden state corresponding to each frame of speech segment according to the posterior probability of the hidden state corresponding to each frame of speech segment by using the HMM.

4. The method according to claim 3, wherein the obtaining the hidden state corresponding to each frame of speech segment according to the posterior probability of the hidden state corresponding to each frame of speech segment by using the HMI comprises:
   converting the posterior probability of the hidden state corresponding to each frame of speech segment to an emission probability of the hidden state corresponding to each frame of speech segment.

5. The method according to claim 1, wherein detecting whether the candidate speech segment comprises a preset keyword by using the machine learning model comprises:
   inputting the candidate speech segment into the CNN;
   performing convolution and pooling on the candidate speech segment by using the CNN, to obtain semantic features of the candidate speech segment through extraction; and
   classifying the semantic features of the candidate speech segment by using the CNN, to detect whether the candidate speech segment comprises the preset keyword.

6. The method according to claim 1, wherein the computing device is a server, and the method further comprises:
   obtaining the speech information from a terminal; and
   after determining that the speech information comprises the preset keyword, transmitting a wakeup instruction to the terminal, the wakeup instruction being configured to lift a dormant state and/or a lock screen state of the terminal.

7. The method according to claim 1, wherein the computing device is a terminal, and the method further comprises:
   after determining that the speech information comprises the preset keyword, generating a wakeup instruction to lift a dormant state and/or a lock screen state of the terminal.

8. A speech recognition device, comprising a processor and a memory, the processor being configured to perform:
   obtaining speech information;
   determining beginning and ending positions of a candidate speech segment in the speech information by using a weighted finite state transducer (WFST) network, the WFST network including a deep neural network (DNN), a hidden Markov model (HMM), a dictionary, and a language model, and the candidate speech segment being identified as corresponding to a preset keyword;
   clipping the candidate speech segment from the speech information according to the beginning and ending positions;
   detecting whether the candidate speech segment comprises the preset keyword by using a convolutional neural network (CNN); and
   determining, upon determining that the candidate speech segment comprises the preset keyword, that the speech information comprises the preset keyword.

9. The device according to claim 8, wherein the determining beginning and ending positions of a candidate speech segment in the speech information by using a weighted finite state transducer (WFST) network comprises:
performing framing on the speech information, to obtain a plurality of frames of speech segments; and
inputting the plurality of frames of speech segments into the WFST network.

10. The device according to claim 9, wherein inputting the plurality of frames of speech segments into the WFST network comprises:
inputting the plurality of frames of speech segments into the DNN, to obtain a posterior probability of a hidden state corresponding to each of the plurality of frames of speech segments; and
obtaining the hidden state corresponding to each frame of speech segment according to the posterior probability of the hidden state corresponding to each frame of speech segment by using the HMM.

11. The device according to claim 10, wherein the obtaining the hidden state corresponding to each frame of speech segment according to the posterior probability of the hidden state corresponding to each frame of speech segment by using the HMM comprises:
converting the posterior probability of the hidden state corresponding to each frame of speech segment to an emission probability of the hidden state corresponding to each frame of speech segment.

12. The device according to claim 8, wherein detecting whether the candidate speech segment comprises a preset keyword by using the machine learning model comprises:
inputting the candidate speech segment into the CNN;
performing convolution and pooling on the candidate speech segment by using the CNN, to obtain semantic features of the candidate speech segment through extraction; and
classifying the semantic features of the candidate speech segment by using the CNN, to detect whether the candidate speech segment comprises the preset keyword.

13. The device according to claim 8, wherein the processor is further configured to perform:
obtaining the speech information from a terminal; and
after determining that the speech information comprises the preset keyword, transmitting a wakeup instruction to the terminal, the wakeup instruction being configured to lift a dormant state and/or a lock screen state of the terminal.

14. The device according to claim 8, wherein the processor is further configured to perform:
after determining that the speech information comprises the preset keyword, generating a wakeup instruction to lift a dormant state and/or a lock screen state of the device.

15. A non-transitory computer-readable storage medium, storing at least one instruction, the at least one instruction being loaded and executed by a processor to implement:
obtaining speech information;
determining beginning and ending positions of a candidate speech segment in the speech information by using a weighted finite state transducer (WFST) network, the WFST network including a deep neural network (DNN), a hidden Markov model (HMM), a dictionary, and a language model, and the candidate speech segment being identified as corresponding to a preset keyword;
clipping the candidate speech segment from the speech information according to the beginning and ending positions;
detecting whether the candidate speech segment comprises the preset keyword by using a convolutional neural network (CNN); and
determining, upon determining that the candidate speech segment comprises the preset keyword, that the speech information comprises the preset keyword.

16. The storage medium according to claim 15, wherein the determining beginning and ending positions of a candidate speech segment in the speech information by using a weighted finite state transducer (WFST) network comprises:
performing framing on the speech information, to obtain a plurality of frames of speech segments; and
inputting the plurality of frames of speech segments into the WFST network.

17. The storage medium according to claim 16, wherein inputting the plurality of frames of speech segments into the WFST network comprises:
inputting the plurality of frames of speech segments into the DNN, to obtain a posterior probability of a hidden state corresponding to each of the plurality of frames of speech segments; and
obtaining the hidden state corresponding to each frame of speech segment according to the posterior probability of the hidden state corresponding to each frame of speech segment by using the HMI.

18. The storage medium according to claim 17, wherein the obtaining the hidden state corresponding to each frame of speech segment according to the posterior probability of the hidden state corresponding to each frame of speech segment by using the HMI comprises:
converting the posterior probability of the hidden state corresponding to each frame of speech segment to an emission probability of the hidden state corresponding to each frame of speech segment.

19. The storage medium according to claim 15, wherein detecting whether the candidate speech segment comprises a preset keyword by using the machine learning model comprises:
inputting the candidate speech segment into the CNN;
performing convolution and pooling on the candidate speech segment by using the CNN, to obtain semantic features of the candidate speech segment through extraction; and
classifying the semantic features of the candidate speech segment by using the CNN, to detect whether the candidate speech segment comprises the preset keyword.

20. The storage medium according to claim 15, wherein the processor is further configured to perform:
obtaining the speech information from a terminal; and
after determining that the speech information comprises the preset keyword, transmitting a wakeup instruction to the terminal, the wakeup instruction being configured to lift a dormant state and/or a lock screen state of the terminal.

* * * * *